(No Model.)

G. W. HARRIS & R. J. HOLLAND.
BOX OR CASE FOR SECONDARY BATTERY ELECTRODES.

No. 598,926. Patented Feb. 15, 1898.

WITNESSES:
C. E. Ashley
Arthur W. Calver

INVENTORS:
Geo. W. Harris
R. J. Holland
By their Attorney
Henry Calver

THE NORRIS PETERS CO., PHOTO-LITHO., WASHINGTON, D. C.

UNITED STATES PATENT OFFICE.

GEORGE W. HARRIS AND RICHARD J. HOLLAND, OF NEW YORK, N. Y.

BOX OR CASE FOR SECONDARY-BATTERY ELECTRODES.

SPECIFICATION forming part of Letters Patent No. 598,926, dated February 15, 1898.

Application filed September 3, 1896. Renewed July 17, 1897. Serial No. 644,995. (No model.)

*To all whom it may concern:*

Be it known that we, GEORGE W. HARRIS, a citizen of the United States, and RICHARD J. HOLLAND, a citizen of Canada and subject of the Queen of Great Britain, residing at New York, in the county of New York and State of New York, have invented certain new and useful Improvements in Boxes or Cases for Secondary-Battery Electrodes, of which the following is a specification, reference being had therein to the accompanying drawings.

Our invention has for its object to provide a case or box for the reception of the electrodes of secondary or storage batteries, and in which the said electrodes are to be placed either for transportation or when being discharged in use, the construction of the said case or box being such that the electrodes may be suitably supported and maintained in proper position relative to each other and in which they will be properly insulated and separated.

To this end our improved case or box, which is of any suitable insulating material, as glass or hard rubber, is provided at its two opposite sides with suitable grooves to receive the electrodes, said box having between said grooves separating-ribs, which are in turn slotted or grooved for the reception of perforated ribbed insulating-plates, which will be placed between the electrodes and which will prevent short-circuiting. The grooves in the sides of the box receiving the electrodes terminate at their bottoms in shoulders which serve as supports for the electrodes, and to prevent the latter from sagging in their middles the bottom of the box is preferably provided with ribs or supports extending transverse to the electrodes and serving to sustain their central portions, these ribs or supports being made either integral with the box or separate therefrom, so as to be adapted to be placed in position or removed when desired. The separating insulating-plates are preferably perforated or made in a skeleton form and are also preferably provided on their opposite sides with ribs to stiffen the same and to maintain them evenly distanced from the electrodes, (or in proper position.)

Figure 1:
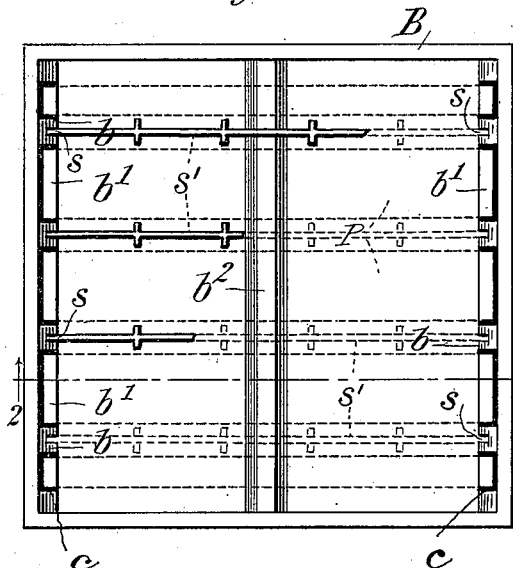
Figure 3:
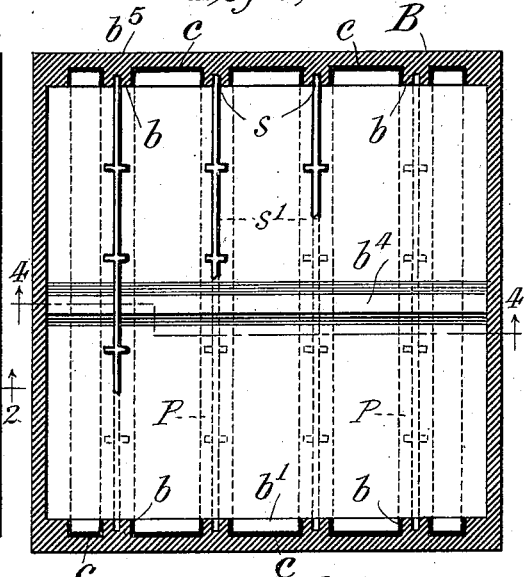
Figure 2:
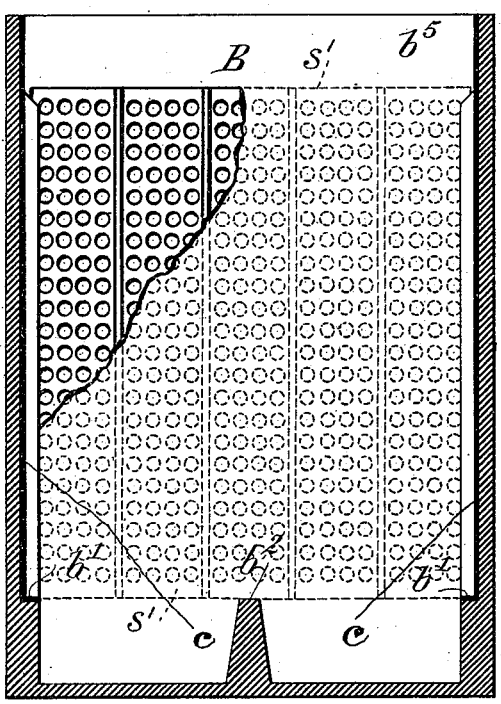
Figure 4:
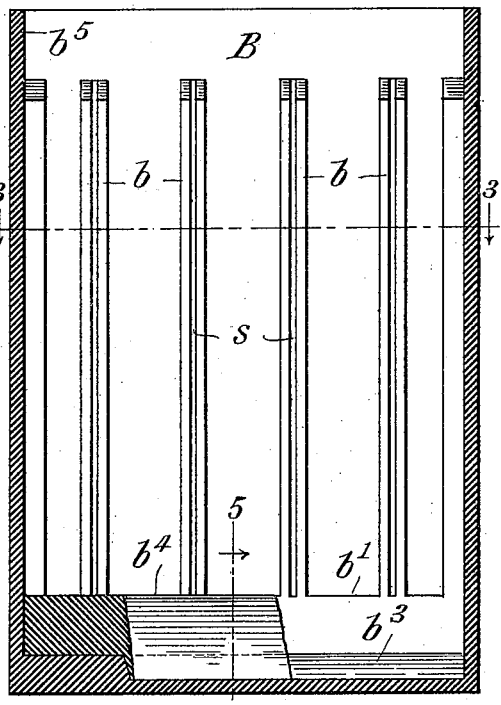
Figure 5:
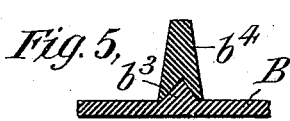

In the accompanying drawings, Figure 1 is a plan view of our improved electrode-containing case or box; and Fig. 2 is a vertical section of the same on line 2 2, Fig. 1. Fig. 3 is a horizontal section of the same on line 3 3 of Fig. 4, and Fig. 4 is a vertical section on line 4 4 of Fig. 3. Fig. 5 is a detail sectional view on line 5 5 of Fig. 4, illustrating a slight modification.

B denotes the case or box, which is of any suitable insulating material and which is provided interiorly on its opposite sides with ribs $b$, which are integral with said sides and between which are grooves to receive the electrodes and which terminate at their bottoms in shoulders $b'$ to serve as supports for the electrodes. The box B is provided at its bottom with a central rib or support $b^2$, which serves to sustain the middle portions of the electrodes and prevent them from sagging. Instead of making this central support integral with the box, as shown in Fig. 2, it may be made separate therefrom, as is the rib $b^4$ in Figs. 4 and 5, this rib $b^4$ being preferably grooved at its bottom to receive a small pointed rib $b^3$, formed integral with the box and which serves to prevent the displacement of the rib or support $b^4$.

In order to insure the proper separation or insulation of the electrodes or to prevent short-circuiting by the accumulation of material between them, the ribs $b$ are preferably provided with slots $s$ to receive perforated insulating-plates $s'$, said plates being of hard rubber, mica, or other suitable insulating material, and being preferably provided on their opposite sides with small ribs to strengthen and stiffen them and to keep them evenly in position between the electrodes. These plates, as will be seen by reference to Figs. 1 and 3, occupy the spaces P between the electrodes, the latter being indicated by dotted lines in these figures. In order to further insure the insulation of the electrodes, the grooves in the opposite sides of the box into which the ends of said electrodes are entered are preferably lined with mica or other insulating material, and which may be applied either in plates or in the form of a liquid paint which will afterward harden, the position of this insulating-lining being denoted at $c$ in Fig. 3.

It will be seen by reference to Figs. 2 and 4 that the grooves in the opposite sides of the box which receive the ends of the electrodes run uninterruptedly from top to bottom, so that the intervening ribs will support the electrodes throughout the entire heights of the latter, and thus prevent any buckling or bending of the same.

Having thus described our invention, we claim and desire to secure by Letters Patent—

1. A box or case, for the reception of electrodes of secondary or storage batteries, formed of insulating material, and provided interiorly on its opposite sides with ribs which are integral with said sides and between which ribs are grooves for the reception of the ends of said electrodes, so that the latter will be held separated from each other, said ribs running uninterruptedly to the height of the electrodes to be received between them so that buckling of said electrodes will be effectively prevented, and the said grooves having a special lining of insulating material, and terminating at their bottoms in shoulders, as $b'$.

2. A box or case, for the reception of electrodes of secondary or storage batteries, formed of insulating material, and provided interiorly on its opposite sides with grooves for the reception of the ends of said electrodes so that the latter will be held separated from each other, and the ribs between said grooves being provided with slots, combined with perforated insulating-plates placed in said slots and having vertical ribs on their opposite sides, said plates serving to properly separate the electrodes from each other and prevent short-circuiting, and said grooves terminating at their bottoms in shoulders, as $b'$, and the said case or box being provided at its bottom with an intermediate support or supports for the middle parts of the electrodes.

In testimony whereof we affix our signatures in presence of two witnesses.

GEORGE W. HARRIS.
RICHARD J. HOLLAND.

Witnesses:
RICHD. F. BROWN,
WM. H. BRUSH.